(12) United States Patent
Yin et al.

(10) Patent No.: US 11,277,623 B2
(45) Date of Patent: Mar. 15, 2022

(54) BLOCK-LEVEL LOSSLESS VIDEO CODING USING IN-LOOP RESHAPING

(71) Applicant: Dolby Laboratories Licensing Corporation, San Francisco, CA (US)

(72) Inventors: Peng Yin, Ithaca, NY (US); Taoran Lu, Santa Clara, CA (US); Fangjun Pu, Sunnyvale, CA (US); Sean Thomas McCarthy, San Francisco, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 17/008,671

(22) Filed: Sep. 1, 2020

(65) Prior Publication Data

US 2021/0084307 A1 Mar. 18, 2021

Related U.S. Application Data

(60) Provisional application No. 62/901,387, filed on Sep. 17, 2019.

(51) Int. Cl.

| *H04N 19/159* | (2014.01) |
|---|---|
| *H04N 19/46* | (2014.01) |
| *H04N 19/82* | (2014.01) |
| *H04N 19/36* | (2014.01) |
| *H04N 19/107* | (2014.01) |
| *H04N 19/51* | (2014.01) |
| *H04N 19/176* | (2014.01) |

(52) U.S. Cl.
CPC ......... *H04N 19/159* (2014.11); *H04N 19/107* (2014.11); *H04N 19/176* (2014.11); *H04N 19/36* (2014.11); *H04N 19/46* (2014.11); *H04N 19/51* (2014.11); *H04N 19/82* (2014.11)

(58) Field of Classification Search
CPC .. H04N 19/107; H04N 19/117; H04N 19/157; H04N 19/159; H04N 19/176; H04N 19/36; H04N 19/46; H04N 19/51; H04N 19/70; H04N 19/82
See application file for complete search history.

(56) References Cited

U.S. PATENT DOCUMENTS

| 2020/0329257 | A1* | 10/2020 | Zhao | H04N 19/176 |
|---|---|---|---|---|
| 2020/0382805 | A1* | 12/2020 | Zhao | H04N 19/119 |
| 2021/0076028 | A1* | 3/2021 | Heo | H04N 19/186 |

FOREIGN PATENT DOCUMENTS

WO 2019160986 8/2019

OTHER PUBLICATIONS

Bross, B. et al "Versatile Video Coding (Draft 6)" JVET of ITU-T SG 16 15th Meeting, Jul. 2019.

(Continued)

*Primary Examiner* — Md N Haque

(57) ABSTRACT

To support lossless mode at the block level when in-loop reshaping (LMCS) is enabled, the following changes are proposed to the existing LMCS pipeline. In intra mode, encode lossless blocks in the original domain, thus bypassing inverse mapping after reconstruction in the decoder. In inter mode, encode lossless blocks in the original domain, thus bypassing both forward mapping after motion compensation and inverse mapping after reconstruction in the decoder. In both modes, disable any LMCS-related color scaling.

6 Claims, 5 Drawing Sheets

(56) References Cited

OTHER PUBLICATIONS

Chen, J. et al Algorithm Description for Versatile Video Coding and Test Model 4 (VTM4) JVET Output document, JVET-M1002-v2, 13th Meeting, Marrakech, Jan. 9-18, 2019.
ITU-R BT.2020-2 "Parameter Values for Ultra-high Definition Television Systems for Production and International Programme Exchange" Recommendation Oct. 2015.
ITU-R BT.2100-1 "Image Parameter Values for High Dynamic Range television for Use in Production and International Programme Exchange" Jun. 2017.
ITU-R BT.709-6 "Parameter Values for the HDTV Standards for Production and International Programme Exchange" Jun. 2015.
SMPTE Standard 2084:2014 "High Dynamic Range Electro-Optical Transfer Function of Mastering Reference Displays".

* cited by examiner

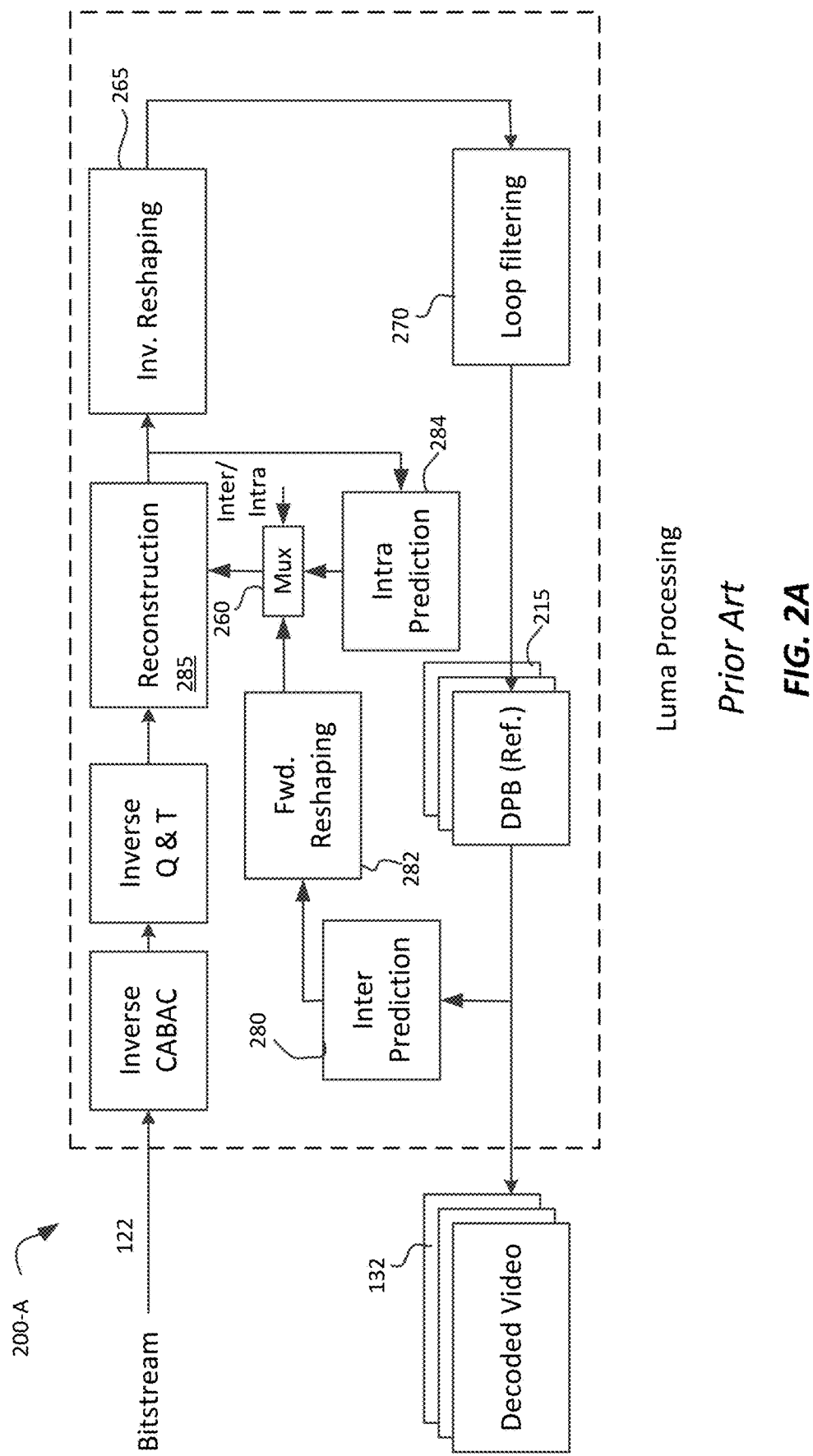
*FIG. 2A* *Prior Art*

BLOCK-LEVEL LOSSLESS VIDEO CODING USING IN-LOOP RESHAPING

CROSS-REFERENCE TO RELATED APPLICATIONS

This application claims priority to U.S. Provisional Patent Application No. 62/901,387, filed Sep. 17, 2019.

TECHNOLOGY

The present document relates generally to images and video coding. More particularly, an embodiment of the present invention relates to enabling block-level lossless video coding using in-loop reshaping.

BACKGROUND

In 2013, the MPEG group in the International Standardization Organization (ISO), jointly with the International Telecommunications Union (ITU), released the first draft of the HEVC (also known as H.265) video coding standard. More recently, the same group has been working on the development of the next generation coding standard (referred to as Versatile Video Coding or VVC standard (Ref. [1])) that provides improved coding performance over existing video coding technologies.

As used herein, the term 'bit depth' denotes the number of pixels used to represent one of the color components of an image. Traditionally, images were coded at 8-bits, per color component, per pixel (e.g., 24 bits per pixel); however, modern architectures may now support higher bit depths, such as 10 bits, 12 bits or more.

In a traditional image pipeline, captured images are quantized using a non-linear opto-electronic function (OETF), which converts linear scene light into a non-linear video signal (e.g., gamma-coded RGB or YCbCr). Then, on the receiver, before being displayed on the display, the signal is processed by an electro-optical transfer function (EOTF) which translates video signal values to output screen color values. Such non-linear functions include the traditional "gamma" curve, documented in ITU-R Rec. BT.709 and BT. 2020, the "PQ" (perceptual quantization) curve described in SMPTE ST 2084, and the "Hybrid Log-gamma" or "HLG" curve described in and Rec. ITU-R BT. 2100.

As used herein, the term "forward reshaping" denotes a process of sample-to-sample or codeword-to-codeword mapping of a digital image from its original bit depth and original codewords distribution or representation (e.g., gamma or PQ or HLG, and the like) to an image of the same or different bit depth and a different codewords distribution or representation. Reshaping allows for improved compressibility or improved image quality at a fixed bit rate. For example, without limitation, reshaping may be applied to 10-bit or 12-bit PQ-coded HDR video to improve coding efficiency in a 10-bit video coding architecture. In a receiver, after decompressing the reshaped signal, the receiver may apply an "inverse reshaping function" to restore the signal to its original codeword distribution.

The term "lossless coding" refers to the coding of a bitstream so that the binary representation of a decoded version of the coded pictures is identical to their input binary representation, before the pictures were encoded.

As appreciated by the inventors here, as development continues for the next generation of a video coding standard, techniques for lossless video coding are desired. Methods of this invention can be applicable to a variety of video content, including, but not limited, to content in standard dynamic range (SDR) and/or high-dynamic range (HDR).

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated byway of example, and not in way by limitation, in the figures of the accompanying drawings and in which like reference numerals refer to similar elements and in which:

FIG. 2A depicts an example architecture for in-loop decoding of luma data according to prior art;

DESCRIPTION OF EXAMPLE EMBODIMENTS

Techniques for block-based lossless video coding when using in-loop reshaping are described herein. In the following description, for the purposes of explanation, numerous specific details are set forth in order to provide a thorough understanding of the various embodiments of the present invention. It will be apparent, however, that the various embodiments of the present invention may be practiced without these specific details. In other instances, to avoid redundancies and improve readability, well-known structures and devices are not described in exhaustive detail.

Summary

Example embodiments described herein relate to block-based lossless video coding when using in-loop reshaping (LMCS). In a decoder, a processor receives a coded bitstream comprising coded blocks. It receives one or more flags indicating that luma mapping and chroma residual scaling (LMCS) is enabled at a slice level of the coded bitstream. Then, for a coded block under a slice where LMCS is enabled, if it receives a flag indicating that LMCS for the coded block is disabled, then:

if in intra mode:

it applies intra reconstruction for the coded block in an original domain to generate a reconstructed intra block, it bypasses LMCS inverse reshaping for the reconstructed intra block; and it applies loop filtering to the reconstructed intra block to generate a decoded video block.

Else if in inter mode:

it applies inter reconstruction for the coded block without applying LMCS forward reshaping after motion compensation, to generate a reconstructed inter block in the original domain; it bypasses LMCS inverse reshaping for the reconstructed inter block; and it applies loop filtering to the reconstructed inter block to generate the decoded video block. In both inter and intra mode, LMCS color scaling is also bypassed.

Example Video Delivery Processing Pipeline

Figure 1:
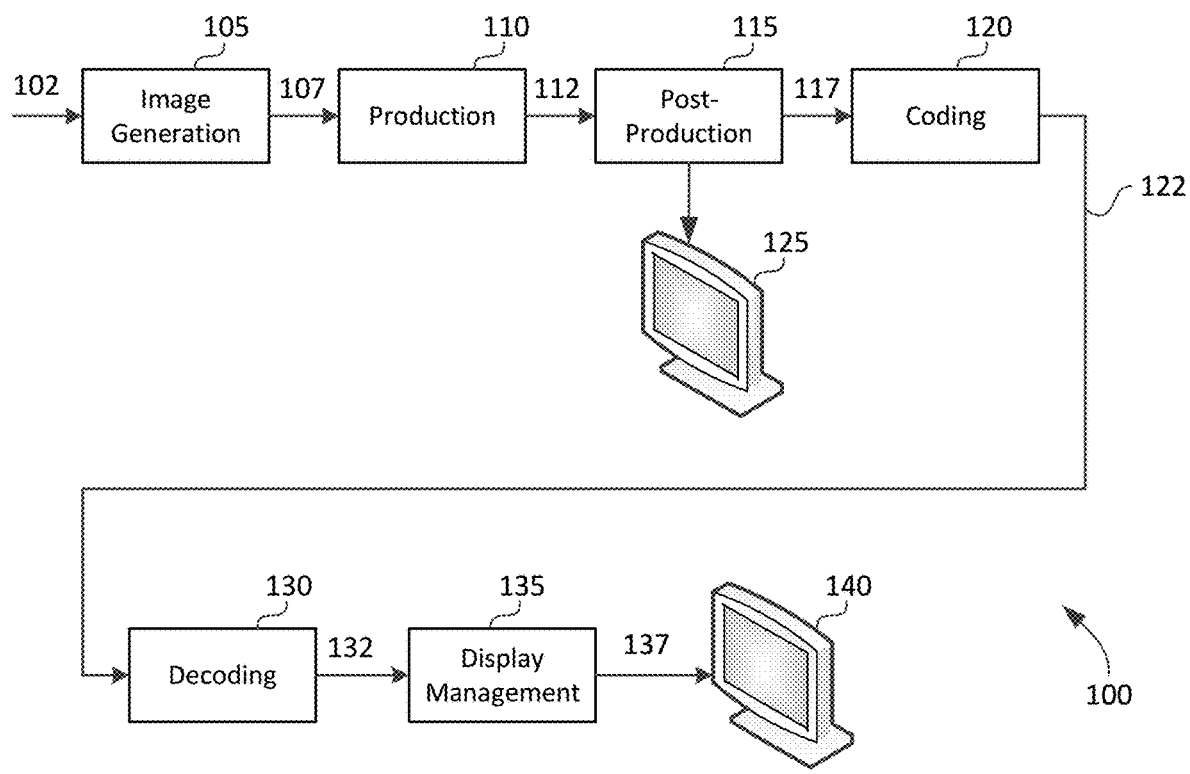
FIG. 1 depicts an example process for a video delivery pipeline according to prior art.

FIG. 1 depicts an example process of a conventional video delivery pipeline (100) showing various stages from video capture to video content display. A sequence of video frames (102) is captured or generated using image generation block (105). Video frames (102) may be digitally captured (e.g. by a digital camera) or generated by a computer (e.g. using computer animation) to provide video data (107). Alternatively, video frames (102) may be captured on film by a film camera. The film is converted to a digital format to provide video data (107). In a production phase (110), video data (107) is edited to provide a video production stream (112).

The video data of production stream (112) is then provided to a processor at block (115) for post-production editing. Block (115) post-production editing may include adjusting or modifying colors or brightness in particular areas of an image to enhance the image quality or achieve a particular appearance for the image in accordance with the video creator's creative intent. This is sometimes called "color timing" or "color grading." Other editing (e.g. scene selection and sequencing, image cropping, addition of computer-generated visual special effects, etc.) may be performed at block (115) to yield a final version (117) of the production for distribution. During post-production editing (115), video images are viewed on a reference display (125).

Following post-production (115), video data of final production (117) may be delivered to encoding block (120) for delivering downstream to decoding and playback devices such as television sets, set-top boxes, movie theaters, and the like. In some embodiments, coding block (120) may include audio and video encoders, such as those defined by ATSC, DVB, DVD, Blu-Ray, and other delivery formats, to generate coded bit stream (122). In a receiver, the coded bit stream (122) is decoded by decoding unit (130) to generate a decoded signal (132) representing an identical or close approximation of signal (117). The receiver may be attached to a target display (140) which may have completely different characteristics than the reference display (125). In that case, a display management block (135) may be used to map the dynamic range of decoded signal (132) to the characteristics of the target display (140) by generating display-mapped signal (137).

Signal Reshaping

Figure 2B:
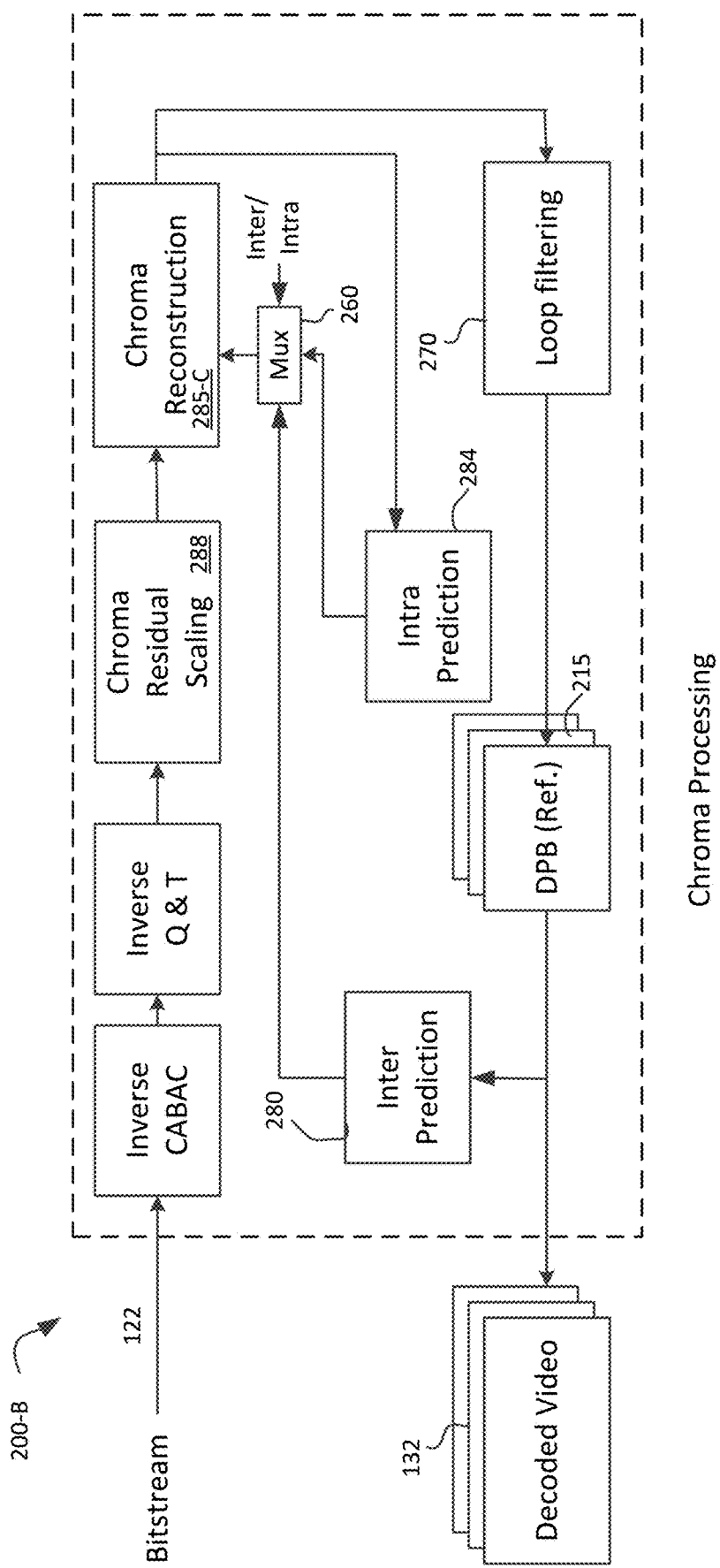
FIG. 2B depicts an example architecture for in-loop decoding of chroma data according to prior art.

As used herein, the term "reshaper" may denote a forward or an inverse reshaping (or mapping) function to be used when coding and/or decoding digital images. FIG. 2A and FIG. 2B depict example decoding processes for in-loop signal reshaping according to Refs. [1-3]. In VVC, reshaping is referred to as LMCS—Luma Mapping with Chroma residue Scaling. Process 200-A is related to luma processing and process 200-B is related to chroma processing.

For luma, given a coded bitstream (122), after inverse arithmetic coding (e.g. inverse CABAC) and inverse quantization and transform (Inverse Q &T), in the reconstruction module (285), given the output $Y_{res}$ of Inverse Q &T, for Inter-coded units (CUs) (e.g., the Mux (260) enables the output from 280 and 282), its output $Y_r$ is computed as:

$$Y_r = (Y_{res} + \text{FwdMap}(Y_{pred})), \quad (1)$$

where $\text{FwdMap}(Y_{pred})$ denotes the output (e.g., $Y_{pred}$) of the inter predictor (280) followed by forward reshaping (282) using forward reshaping function FwdMap( ). Otherwise, for Intra CUs (e.g., the Mux (260) enables the output from intra prediction unit 284), the output of the reconstruction module (285) is $$Y_r = (Y_{res} + I\text{PredSample}), \quad (2)$$

where IPredSample denotes the output of the Intra Prediction block (284). Given an inverse reshaping function InvMap( ), the inverse Reshaping block (265), generates $$Y_{ir} = \text{InvMap}(Y_r). \quad (3)$$

Inverse reshaping (265) is followed by traditional loop filtering (270) in the original domain, and the output of loop filtering is stored in the display-picture-buffer (DPB) (215) to be used as reference pictures for inter prediction (280) or to generate the decoded video (132).

For chroma, when in-loop reshaping is enabled, as depicted in FIG. 2B, the following changes are made:
  The forward and reverse reshaping blocks (282 and 265) blocks are not used
  There is a new chroma residual scaling block (288); and
  The reconstruction block (285-C) is modified to handle color residuals as $$C_x\text{Rec} = C_x\text{Pred} + C_x\text{Res}, \quad (4)$$

where CxRes denotes the output of chroma residual scaling block (288), CxPred denotes the output of predicted chroma samples, generated either by the Intra (284) or Inter (280) Prediction blocks, and CxRec denotes the output.

Let CxResScaled denote the extracted scaled chroma residual signal after inverse quantization and transform (before block 288), and let $$C_x\text{Res} = C_x\text{ResScaled} * C_{ScaleInv}, \quad (5)$$

denote the rescaled chroma residual generated by the Chroma Residual scaling block (288) to be used by the reconstruction unit (285-C) to compute its output according to equation (4).

The $C_{ScaleInv}$ value being used for a Transform Unit (TU) may be shared by the Cb and Cr components, it is luma dependent, and can be computed as follows:
  Regardless of the coding mode, the average $\text{avgY'}_{TU}$ is calculated using luma reconstructed samples from the top row and left column neighbors (when available) of the current virtual pipeline data unit (VPDU).
  In an embodiment, one can apply a LUT to compute $C_{ScaleInv}$ based on $\text{avgY'}_{TU}$. Alternatively, given a piece-wise-linear (PWL) representation of the reshaping function one may find the index idx where the value $\text{avgY'}_{TU}$ belongs to in the inverse-mapping PWL.
  Then, $C_{ScaleInv} = \text{cScaleInv}[\text{idx}]$.

An example implementation, as it is applicable to the Versatile Video Coding codec can be found in Ref. [1].

Lossless Coding in VVC with LMCS

In general, from a coding point of view, LMCS (or in-loop reshaping) may be considered a lossy operation; however, there are applications where lossless coding is preferred. In this section, a variety of embodiments supporting lossless LMCS will be presented.

In a first embodiment, LMCS will be lossless provided the forward and reverse mapping functions are invertible. For example, if $$X_{out} = \text{InvMap}(\text{FwdMap}(X_{in})), \quad (6)$$

then $X_{out}$ should be equal to Xi, for all valid input codewords. For all practical purposes, since such an implementation requires an identity forward mapping (e.g., $X_{in} = \text{FwdMap}(X_{in})$), this embodiment is equivalent to completely disabling LMCS in video coding.

In the latest draft of the VVC specification (Ref. [1]), the flag slice_lmcs_enabled_flag provides a control mechanism to enable or disable LMCS at the slice level. So, at the slice level, lossless coding can be enabled by simply disabling LMCS, that is by setting slice_lmcs_enabled_flag=0. Currently, outside of completely disabling LMCS, there is no provision to disable LMCS at the block level.

Figure 3A:
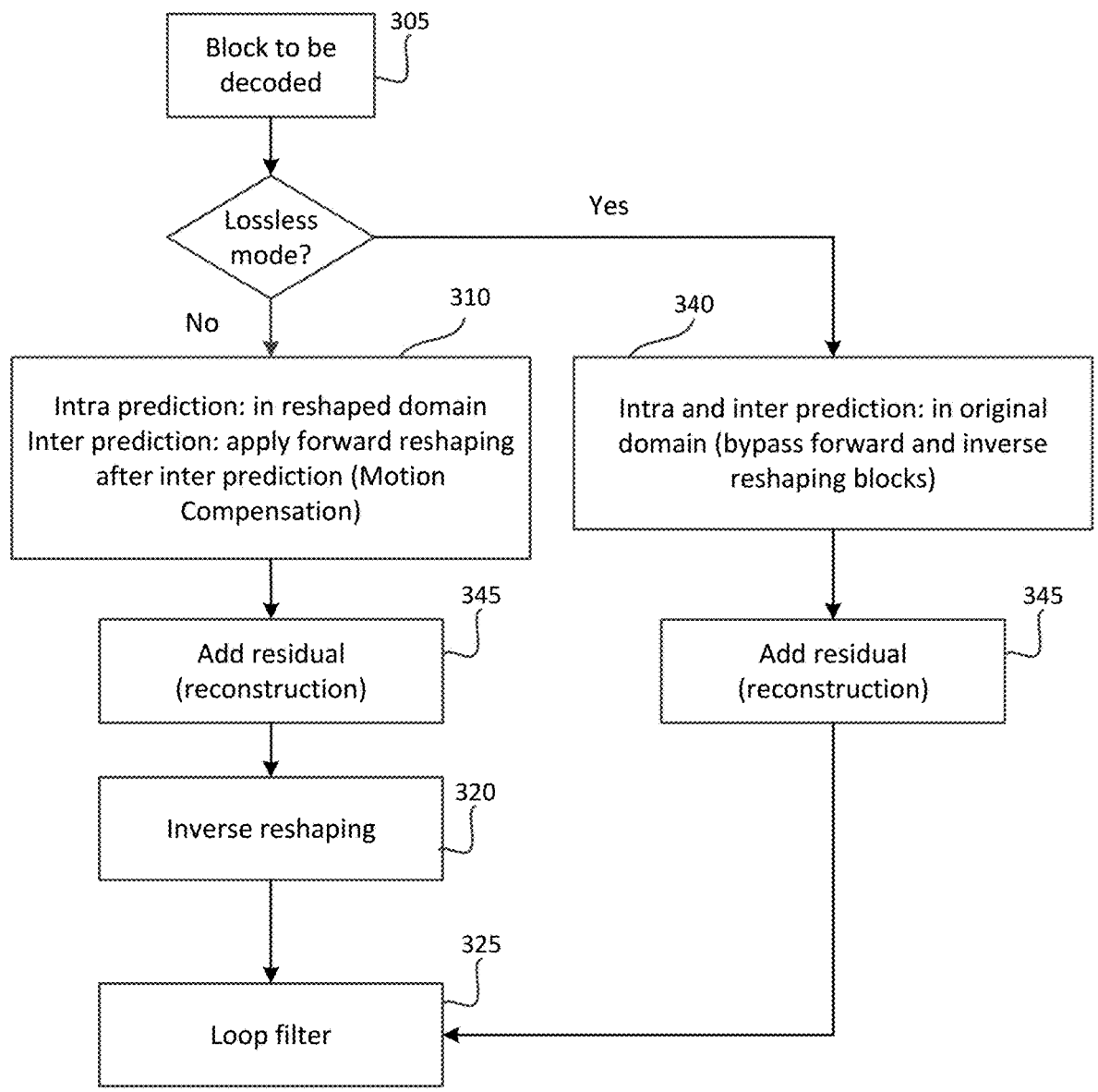
FIG. 3A and FIG. 3B depict example data flows for block-level lossy and lossless coding with in-loop reshaping according to an embodiment.
Figure 3B:
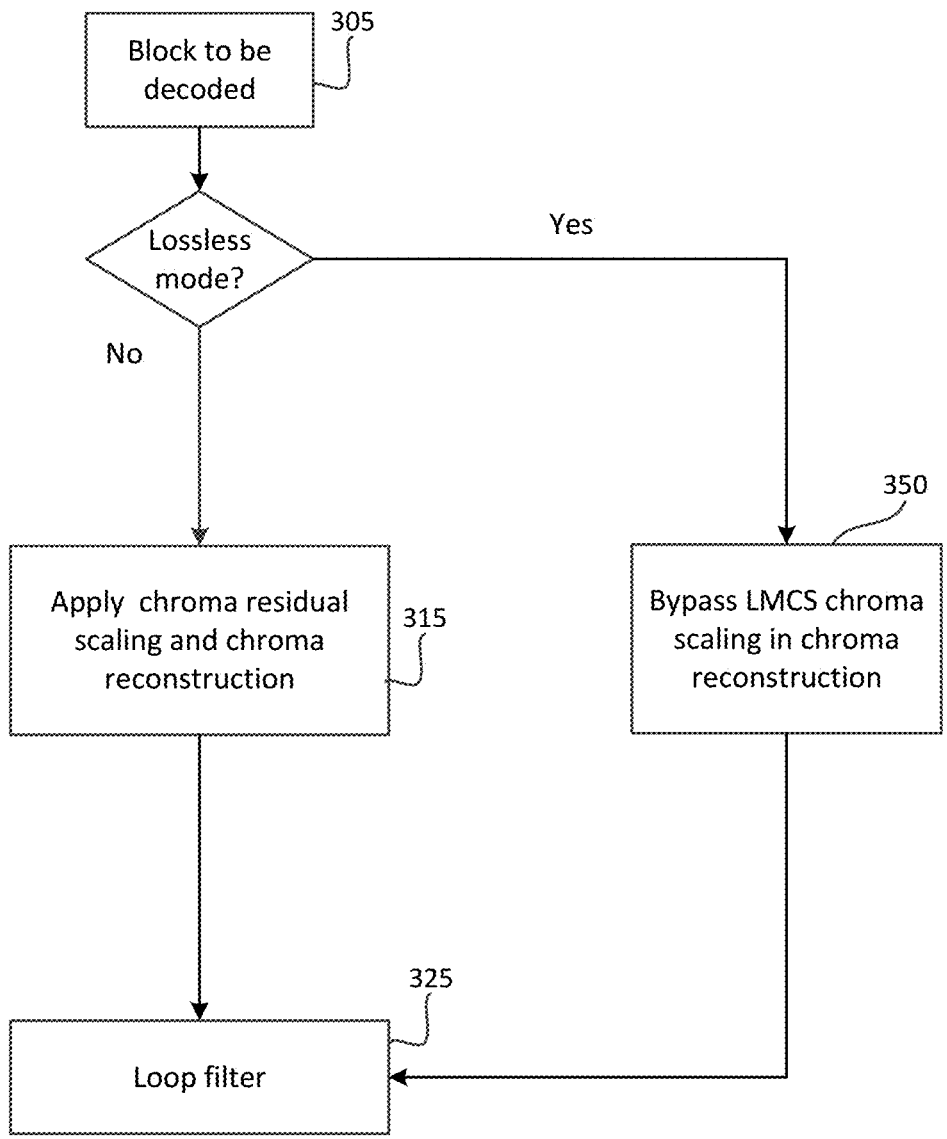

FIG. 3A (luma processing) and FIG. 3B (chroma processing) depict example data flows to support block-level lossless coding (or simply disable LMCS at the block level) when using LMCS according to an embodiment. For convenience, the data flows depict decoding for both lossy and lossless modes. In both cases, references will also be made to figures FIG. 2A and FIG. 2B.

For lossy luminance coding, the dataflow in FIG. 3A matches the dataflow in FIG. 2A. Thus, after inverse CABAC and transformation, when decoding a block (305), if in lossy mode:

Intra prediction (284 or 310) is performed in the reshaped domain, thus, for luma samples, reconstruction (285, 345) in the reshaped domain is followed by inverse reshaping (265, 320), and loop filtering (270, 325).

For inter prediction (310), as depicted in FIG. 2A, for luma samples, forward reshaping (282) is applied after inter prediction (280) before reconstruction (285). Reconstruction (285, 345) in the reshaped domain is followed by inverse reshaping (265, 320), and loop filtering (270, 325).

Note: In lossy intra prediction, neighboring reconstructed pixels may be used for prediction. If neighboring reconstructed pixels are not in the same block as the current pixels, and the neighboring block and the current block do not have the same lossless mode (i.e., one block uses lossless coding and another block uses lossy coding), then one of the following methods could be performed.

Method a: mark the neighbor reconstructed pixels that are in a different mode as not available for intra prediction.

Method b: apply a forward mapping to the neighbor reconstructed pixels to be in the same domain as the current block Method c: do nothing; this may affect overall coding efficiency For lossy chroma coding, as depicted in FIG. 3B, in step 315, chroma residual scaling (288) and chroma reconstruction (285-C) are applied for both intra and inter coding. This is followed by loop filtering (325, 270).

If in lossless luminance mode, from FIG. 3A:

Intra prediction (340) should be performed in the original domain (that is, LMCS is turned off); this requires that inverse reshaping (265) is bypassed Inter prediction (340, 280) should also be performed in the original domain; this requires that both inverse reshaping (265) and forward reshaping (282) are bypassed Thus, reconstruction (285, 345) in the original domain is followed by loop filtering (270, 325)

Note: In lossless intra prediction, neighboring reconstructed pixels may be used for prediction. If neighboring reconstructed pixels are not in the same block as the current pixels, and the neighboring block and the current block do not have the same lossless mode (i.e., one block uses lossless coding and another block uses lossy coding), then one of the following methods could be performed.

Method a: mark the neighbor reconstructed pixels that are in a different mode as not available for intra prediction.

Method b: apply an inverse mapping to the neighbor reconstructed pixels to be in the same domain as the current block; this may affect coding efficiency, but since reshaping is used only in prediction, coding remains lossless Method c: do nothing; this may affect overall coding efficiency, but coding remains lossless For lossless chroma coding, as depicted in FIG. 3B, there is no more LMCS-related chroma scaling (288), and chroma reconstruction (285-C, 350) is followed by loop filtering (325, 270).

Syntax Changes

Two solutions are proposed to support enabling turning on and off LMCS at the block level. In a first embodiment, one could use a generic flag, such as the cu_transquant_bypass_flag used in HEVC to control block-level lossless coding. In another embodiment, one may add a dedicated LMCS block-level flag, similar to the existing flags used for ALF and SAO filtering. As an example, in coding_unit_tree( ), one can add a new lmcs_ctb_flag. The flag can be conditioned on transquant_bypass_enabled_flag, because the CTU block-level LMCS process is only needed for lossless case.

Table 1 depicts an example of the proposed syntax changes according to an embodiment.

TABLE 1

Example syntax to support disabling LMCS at the block level

| | Descriptor |
|---|---|
| coding_tree_unit( ) {<br>  xCtb = ( CtbAddrInRs % PicWidthInCtbsY ) << CtbLog2SizeY<br>  yCtb = ( CtbAddrInRs / PicWidthInCtbsY ) << CtbLog2SizeY<br>  . . .<br>  if( slice_lmcs_enabled_flag & &<br>  transquant_bypass_enabled_flag )<br>    lmcs_ctb_flag][ xCtb >> CtbLog2SizeY ]<br>    [ yCtb >> CtbLog2SizeY ]<br>  . . .<br>} | <br><br><br><br><br><br><br>ae(v) | lmcs_ctb_flag[xCtb>>CtbLog 2SizeY][yCtb>>CtbLog 2SizeY] equal to 1 specifies that the LMCS is applied to the coding tree block of the coding tree unit at luma location (xCtb, yCtb). lmcs_ctb_flag[xCtb>>CtbLog 2SizeY][yCtb>>CtbLog 2SizeY] equal to 0 specifies that the LMCS is not applied to the coding tree block of the coding tree unit at luma location(xCtb, yCtb). When lmcs_ctb_flag [xCtb>>CtbLog 2SizeY][yCtb>>CtbLog 2SizeY] is not present, it is inferred to be equal to slice_lmcs_enabled_flag.

REFERENCES

Each one of the references listed herein is incorporated by reference in its entirety.

[1] B. Bross, J. Chen, and S. Liu, "*Versatile Video Coding* (Draft 6)," JVET output document, JVET-O2001, vE, uploaded, Jul. 31, 2019.

[2] PCT Application PCT/US2019/017891, Image Reshaping in Video Coding Using Rate Distortion Optimization, filed on Feb. 13, 2019, by P. Yin et al.

[3] "*Algorithm description for Versatile Video Coding and Test Model* 4 (*VTM* 4)," J. Chen et al., JVET Output document, JVET-M1002-v2, 13$^{th}$ Meeting, Marrakech, 9-18 Jan. 2019.

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control, or execute instructions relating to block-based lossless video coding when using in-loop reshaping, such as those described herein. The computer and/or IC may compute any of a variety of parameters or values that relate to block-based lossless video coding when using in-loop reshaping processes described herein. The image and video embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement methods related to block-based lossless video coding when using in-loop reshaping as described above by executing software instructions in a program memory accessible to the processors. The invention may also be provided in the form of a program product. The program product may comprise any non-transitory and tangible medium which carries a set of computer-readable signals comprising instructions which, when executed by a data processor, cause the data processor to execute a method of the invention. Program products according to the invention may be in any of a wide variety of non-transitory and tangible forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

EQUIVALENTS, EXTENSIONS, ALTERNATIVES AND MISCELLANEOUS

Example embodiments that relate to the efficient block-based lossless video coding when using in-loop reshaping are thus described. In the foregoing specification, embodiments of the present invention have been described with reference to numerous specific details that may vary from implementation to implementation. Thus, the sole and exclusive indicator of what is the invention and what is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method to decode a coded video bitstream using in-loop reshaping in lossless mode, the method performed by a processor and comprising:
   receiving a coded bitstream comprising coded blocks;
   receiving a first flag indicating that luma mapping and chroma scaling (LMCS) is enabled for all coded blocks in a slice of the coded bitstream;
   for a coded block in the slice wherein LMCS is enabled, if receiving a second flag indicating that LMCS for the coded block is disabled, then:
     if in intra mode:
       applying intra reconstruction for the coded block in an original domain to generate a reconstructed intra block;
       bypassing LMCS inverse reshaping for the reconstructed intra block; and
       applying loop filtering to the reconstructed intra block to generate a decoded video block;
     else if in inter mode:
       applying inter reconstruction for the coded block without applying LMCS forward reshaping after motion compensation, to generate a reconstructed inter block in the original domain;
       bypassing LMCS inverse reshaping for the reconstructed inter block; and
       applying loop filtering to the reconstructed inter block to generate the decoded video block, wherein if decoding of the coded block is depending on a neighbor block and the neighbor block was decoded with LMCS enabled, then applying LMCS inverse mapping to pixels of the neighbor block before generating the reconstructed intra block.

2. The method of claim 1, wherein in either intra or inter mode, LMCS chroma scaling of pixel values in the coded block is bypassed.

3. The method of claim 1, further comprising:
   if not receiving the second flag indicating that LMCS for the coded block is disabled, then:
     if in intra mode:
       applying intra reconstruction for the coded block in a reshaped domain to generate a reconstructed intra block in the reshaped domain;
       applying LMCS inverse reshaping to the reconstructed intra block to generate an intra block in the original domain; and
       applying loop filtering to the reconstructed intra block in to generate the decoded video block;
     else if in inter mode:
       applying inter reconstruction for the coded block with LMCS forward reshaping after motion compensation, to generate the reconstructed inter block in the reshaped domain;
       applying LMCS inverse reshaping to the reconstructed inter block to generate an inter block in the original domain; and
       applying loop filtering to the inter block in the original domain to generate the decoded video block.

4. The method of claim 3, wherein if in intra mode, further comprising:
   if decoding of the coded block is depending on a neighbor block and the neighbor block was decoded with LMCS disabled, then applying LMCS forward mapping to pixels of the neighbor block before generating the reconstructed intra block in the reshaped domain.

5. An apparatus comprising a processor and configured to perform a method as recited in claim 1.

6. A non-transitory computer-readable storage medium having stored thereon computer-executable instructions for executing a method with one or more processors in accordance with claim 1.

\* \* \* \* \*